UNITED STATES PATENT OFFICE.

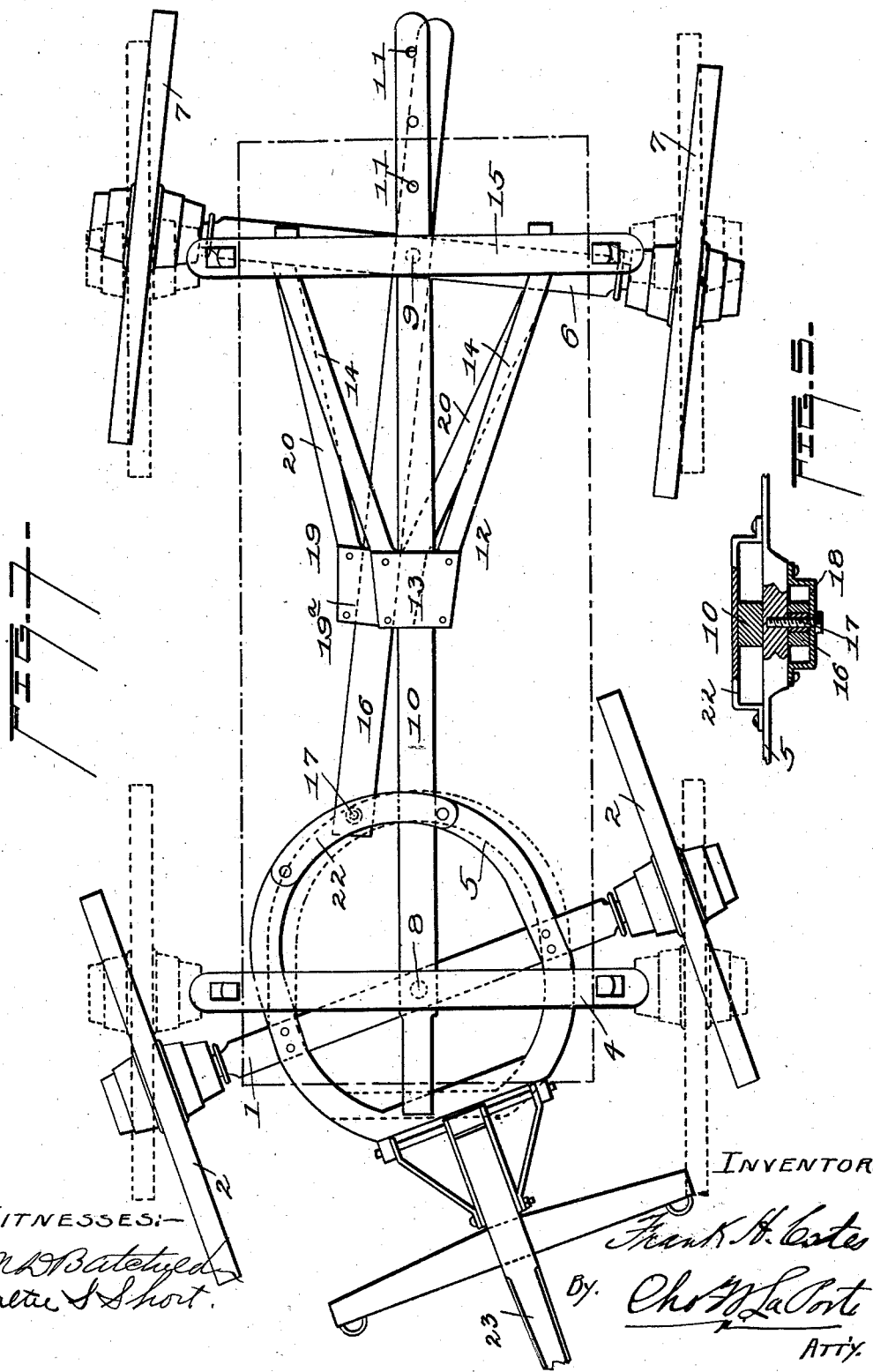

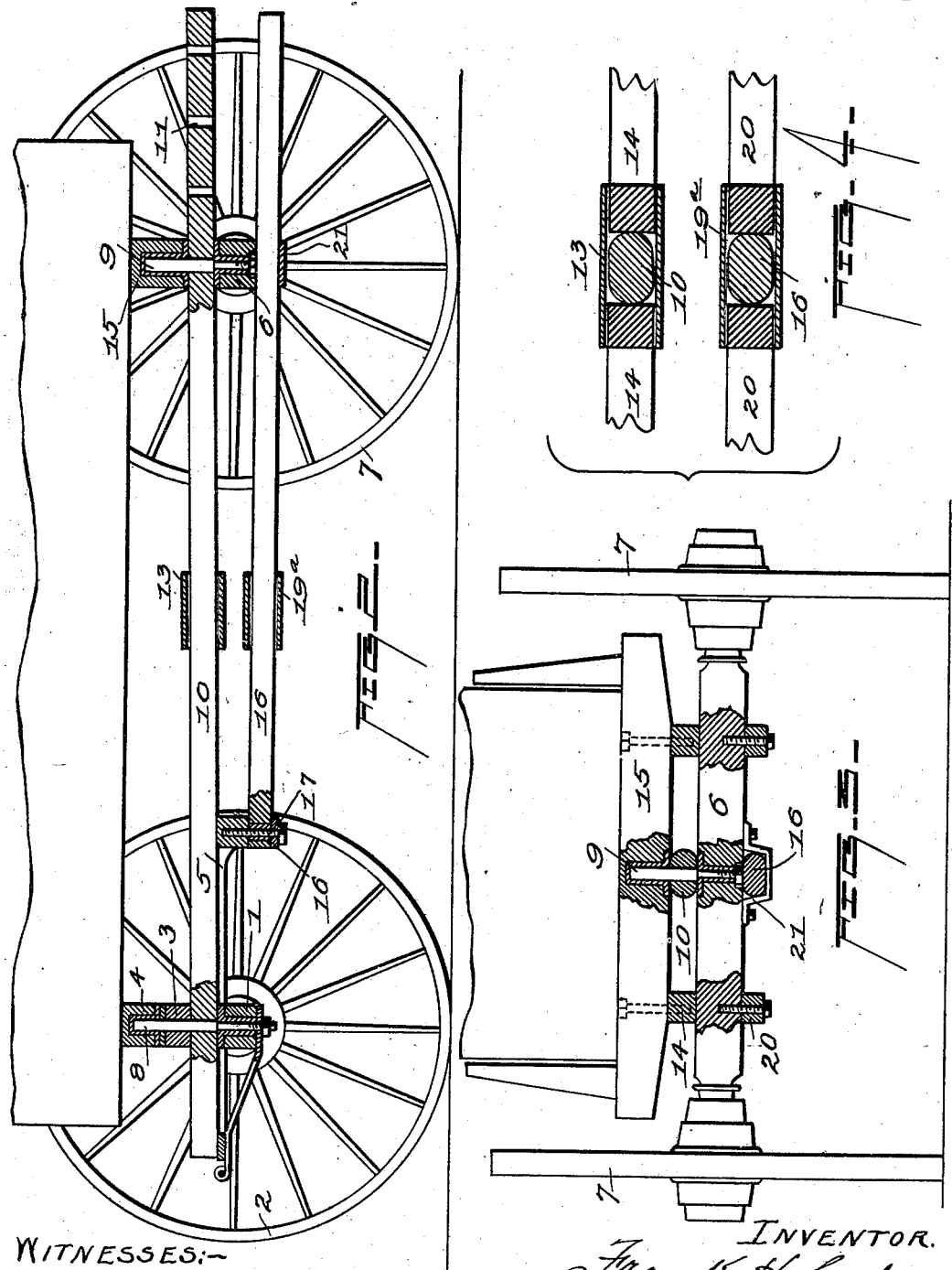

FRANK H. COTES, OF PEORIA, ILLINOIS.

VEHICLE.

SPECIFICATION forming part of Letters Patent No. 671,206, dated April 2, 1901.

Application filed November 8, 1900. Serial No. 35,813. (No model.)

*To all whom it may concern:*

Be it known that I, FRANK H. COTES, a citizen of the United States, residing at Peoria, in the county of Peoria and State of Illinois, have invented certain new and useful Improvements in Vehicles; and I do hereby declare that the following is a full, clear, and exact description of the invention, which will enable others skilled in the art to which it appertains to make and use the same.

This invention relates to vehicles, and especially to that class known as "short-turn" vehicles.

My object is to produce a vehicle in which a reach connects the axles and has a king-bolt coupling with each of said axles, so that it takes the longitudinal strain, the same having connection with a hound fast to the rear bolster and has a bearing relation with a front hound having front and rear extensions of the front axle and in which a suitable member is provided capable of reciprocation, arranged to lie in a plane beneath the reach and have a slidable bearing relation in a hound fast to the rear axle and having its forward end pivotally connected with the rear extension of the front hound, and to further details of construction, hereinafter more particularly described in the specification and claimed in the appended claims, reference being had to the accompanying drawings, in which—

Figure 1 is a top plan of a vehicle with the body shown in dotted lines and the running-gear shown cramped or in the act of turning. Fig. 2 is a longitudinal vertical sectional elevation of the vehicle with some parts removed. Fig. 3 is a cross-section through the rear running-gear. Figs. 4 and 5 are sectional details of certain parts of the gear.

In the present invention I have aimed to construct for practical use a short-turn vehicle which has embodied in its construction all of the well-known and best-adapted features which prevail in vehicles now generally used and to combine with these features a few additional elements to enable the same to be turned in a very short radius—that is to say, in the construction of the vehicle the reach has a king-bolt connection with the front bolster, sand-board, and axle, and has a stiff connection with the rear axle and bolster by king-bolt coupling, and a stiff hound is provided in front by extending the reach forward of the axle and have a bearing relation with a front extension of the hound, and the rear hound is made fast only to the rear bolster, which arrangement will retain the king-bolts equidistant at all times and take up the longitudinal strain, and by the provision of a member pivoted to the front hound and having a reciprocal bearing relation with a supplemental hound fast to the rear axle the turning of the vehicle will impart a reciprocal movement to the member and cause a corresponding movement of its connections with the rear axle, with means provided to regulate the turning of the running-gear.

1 refers to the front axle of the vehicle, provided with the wheels 2 2, and 3 is the sand-board, and above the same is carried a bolster 4, and supported on the axle I have shown a hound 5, which may be of the contour shown in the drawings, formed of one piece, or, if desirable, of more than one piece, with a portion carried in front of the axle and a portion lying at the rear of the same, for a purpose to be described. 6 is the rear axle, provided with the wheels 7 7 and a bolster 15, supported above the same. This arrangement of axle, sand-board, and bolster in the front and the axle and bolster at the rear is of usual construction, and the same are held by suitable king-bolt couplings 8 and 9.

10 is a reach which connects the axles and is pivotally connected to the king-bolts 8 and 9 at the front and rear of the gear, the forward portion of which has a bearing relation with the rear portion of the hound 5 and an extension of which forward of the axle bears on the front portion of the hound 5, as shown. This construction will take up the longitudinal strain, hold the centers equidistant at all times, and the bearing between the reach and the points mentioned on the hound front and rear of the axle forms a stiff hound and support for the gear at this point. The rear of the reach is shown with a series of perforations 11 to enable the rear gear to be extended and lengthen the bed of the vehicle.

12 refers to a hound having the body portion 13 and the side rails 14, which connect with and are made fast to the bolster 15 of the rear gear. The reach 10 passes through the body portion 13 of the hound 12, and the same forms a support for the body of the reach.

16 is a suitable member lying normally parallel and beneath the reach and is somewhat shorter in length, arranged to extend from the rear of the front hound to a point beyond the rear axle. This member 16 has a pivotal relation with the hound 5 at 17 and is seated in the support 18, secure to the lower face of the hound. Extending rearwardly, as described, it passes through a supplemental hound 19, which may be, as shown, a duplicate of the hound 12, having the body portion 19ᵃ and the side rails 20, which are fast to the rear axle, and the reach crosses the rear axle beneath the same and is carried in the support 21, fast to the axle. The only positive connection with the gear is at the point 17 with the front hound. The arrangement is such that when the front axle is cramped or turned in either direction the hound 5, which will move in an arc, exerts a reciprocal lateral movement to the member 16, forcing it outward, and this, through its bearing relation with the hound 18 and its connection with the axle, will turn the rear axle and wheels correspondingly, and the stiff connection between the reach and axles will hold the bolster stationary, as also the box thereon.

To regulate or limit the swing of the front axle as also the front hound 5, I have provided a strap 22, fastened at opposite ends to the upper face of the hound on opposite sides of the reach, which will allow of play between the hound and reach and yet at the same time when the front axle is cramped so that its wheels are bearing close to the box one end of the strap 22 will engage with the reach, and thus limit the swing of the axle. It is to be further observed that in this construction the radius in which the vehicle will turn may be increased or decreased, as an extension may be added to the hound 5, which will bring the pivotal point 17 at or near the center of the gear and permit the rear wheels to track the front wheels.

23 refers to a pole which may be suitably coupled to the hound 5, as shown, or in any other desirable manner.

It is obvious that various changes may be made in the construction of the device, the king-bolt coupling may be varied to suit the needs incident to coupling with both axles, and the hounds modified to other suitable vehicles, and the entire arrangement otherwise suitably changed without departing from the spirit of invention herein disclosed.

Having thus fully described my invention, what I claim, and desire to secure by Letters Patent of the United States, is—

1. In a vehicle-gear, the combination, with the axles, a front hound, duplicate rear hounds secured to the bolster and axles respectively, a reach connecting the axles, a reciprocal member having a bearing relation with the hound secured to the rear axle, the front end thereof having a pivotal connection with an extension of the front hound, means secured to the front hound for engaging with the reach when the front axle is cramped, substantially as described.

2. In a vehicle, the mechanism whereby the running-gear may turn in a short radius, comprising a front hound and duplicate rear hounds, a stiff reach, a member lying beneath the reach, one end pivotally connected to means secured to the front axle, and having a slidable bearing relation with the lower rear duplicate hound, the arrangement being such that when the front axle is cramped the member will reciprocate and cause the rear axle to cramp correspondingly, substantially as shown and described.

3. In a vehicle, the combination with the axles and stiff reach connecting them, a front hound having portions in front and rear of the axle, duplicate rear hounds connected with the bolster and axle, a reciprocal member lying beneath and parallel with the stiff reach and having a bearing relation with the hound secured to the rear axle and having its forward end supported in a strap secured to the lower face of the front hound and a strap carried on the upper face of the front hound and extending over the stiff reach and arranged to engage the same, substantially as shown and described.

4. A running-gear, comprising front and rear axles, duplicate hounds having connection with the rear bolster and axle respectively, a reach connecting the axles, a king-bolt coupling of the reach with each axle, arranged to hold the axle-centers equidistant at all times, of a suitable member carried across the axial center of the rear axle having its forward end pivotally connected with means carried by the front axle, the same arranged when the vehicle is describing a circle or any part thereof to reciprocate and accommodate itself to the movements of the forward axle when turning, substantially as described.

5. A short-turn vehicle, comprising front and rear axles, a hound connected with the front axle and having portions thereof bearing in front and rear of said axle, a hound connected with the rear axle, a hound connected with the rear bolster, of a reach connecting the axles, a king-bolt coupling with each axle, and the reach having a forward and rear extension of each axle, a suitable member lying parallel with the reach and below the same, having connection with the hound secured to the rear axle and a pivotal connection with the rear portion of the front hound and arranged to reciprocate across the axial center of the rear axle, substantially as described.

6. In a vehicle, the combination with the front and rear axles, a front hound, duplicate rear hounds connecting the bolster and axle respectively, a reach having a king-bolt coupling with front and rear axles, and engaging the front hound at points in front and rear of the front axle and having a positive connection with the hound secured to the rear bolster, of a member capable of reciprocation lying in a plane beneath the reach and having a loose connection with the hound connected with the rear axle, the outer end having a pivotal connection with the rear extension of the forward hound, a strap secured to the front hound arranged to engage the reach at a suitable point in the movement of the front hound when the front axle is cramped, substantially as described.

7. A vehicle, the running-gear of which comprises front and rear axles, a front hound and duplicate rear hounds, a stiff reach connecting the axles and supported by one of said rear hounds and having its forward portion engaging portions of the front hound in front and rear of the front axle, a strap secured to the hound and extending over the stiff reach, of a reciprocal member lying beneath the reach and having a sliding bearing relation in the lower rear hound and its forward end coupled in a strap secured to the lower face of the front hound, all arranged in the manner and operated substantially as described.

8. In a vehicle, the combination with front and rear axles and hounds, a stiff reach, a reciprocal member lying beneath the reach and pivotally connected to a rear extension of the front hound, of a strap arranged to straddle the stiff reach and secured at opposite ends to the front hound, arranged in the movement of the front axle to engage the side of the reach and thereby limit the swing of the front axle, substantially as described.

9. In a vehicle, the combination with the axles and a stiff reach connecting them and supported by front and rear hounds, a supplemental reach pivoted at its front end to the lower face of the front hound and supported by mechanism carried by the rear axle to permit reciprocation across the axis thereof, a strap or equivalent means supported by means attached to the front axle, arranged in the movement of said axle to engage the stiff reach and thereby limit the swing of said axle, substantially in the manner shown.

In witness whereof I have affixed my signature in presence of two witnesses.

FRANK H. COTES.

Witnesses:
JOSEPH W. MAPLE,
CHAS. W. LA PORTE.